US012139889B2

(12) United States Patent
Weber et al.

(10) Patent No.: US 12,139,889 B2
(45) Date of Patent: Nov. 12, 2024

(54) METHOD FOR ASSISTING OR TRAINING OPERATORS TO OPERATE MACHINES

(71) Applicant: Caterpillar Inc., Peoria, IL (US)

(72) Inventors: Michael Adam Weber, Dunlap, IL (US); David Charles Copley, Peoria, IL (US); Norval P Thomson, Dunlap, IL (US); Michael Lynn Johnson, Lacon, IL (US); Eric W Cler, Oswego, IL (US); Brad Robert Van De Veer, Washington, IL (US)

(73) Assignee: Caterpillar Inc., Peoria, IL (US)

( * ) Notice: Subject to any disclaimer, the term of this patent is extended or adjusted under 35 U.S.C. 154(b) by 253 days.

(21) Appl. No.: 17/734,636

(22) Filed: May 2, 2022

(65) Prior Publication Data

US 2023/0061370 A1    Mar. 2, 2023

(51) Int. Cl.
*E02F 9/26* (2006.01)
*B60W 50/16* (2020.01)
*B60W 50/14* (2020.01)

(52) U.S. Cl.
CPC ............. *E02F 9/267* (2013.01); *B60W 50/16* (2013.01); *E02F 9/264* (2013.01); *B60W 2050/143* (2013.01); *B60W 2300/17* (2013.01)

(58) Field of Classification Search
CPC ....... B60W 2050/143; B60W 2300/17; B60W 50/16; E02F 3/431; E02F 3/435; E02F 9/205; E02F 9/264; E02F 9/267
See application file for complete search history.

(56) References Cited

U.S. PATENT DOCUMENTS

| | | | |
|---|---|---|---|
| 8,793,055 B2 | 7/2014 | Eklund et al. | |
| 9,666,095 B2 | 5/2017 | Swiderski et al. | |
| 9,852,625 B2 | 12/2017 | Victor et al. | |
| 9,969,404 B2 | 5/2018 | McNew | |
| 10,280,597 B2* | 5/2019 | Izumikawa | E02F 9/20 |
| 10,570,582 B2* | 2/2020 | Berry | E02F 9/265 |
| 10,704,228 B2* | 7/2020 | Tsuji | B60K 35/00 |
| 11,168,466 B2* | 11/2021 | Izumikawa | E02F 3/32 |
| 2010/0042281 A1 | 2/2010 | Filla | |
| 2015/0004572 A1 | 1/2015 | Bomer et al. | |
| 2015/0004573 A1 | 1/2015 | Bomer et al. | |
| 2020/0094853 A1* | 3/2020 | Tate | B60W 50/16 |
| 2021/0254306 A1 | 8/2021 | Krone et al. | |
| 2023/0259129 A1* | 8/2023 | Takahashi | G05D 1/0212 |
| | | | 701/50 |

* cited by examiner

*Primary Examiner* — Tyler J Lee

(57) ABSTRACT

A method for assisting an operator in operating a machine. The method includes receiving, by a controller, a selection of a task of a plurality of tasks, each task associated with a corresponding movement pattern of the machine; sensing, by a sensor unit, at least one condition of at least one component of the machine associated with the selected task; and determining, by the controller, whether the condition is within a predetermined set of parameters associated with the selected task. In response to determining that the condition is not within the predetermined set of parameters, the method further includes generating, by the controller, an audible or a haptic signal associated with at least one of the condition or the at least one component.

17 Claims, 10 Drawing Sheets

METHOD FOR ASSISTING OR TRAINING OPERATORS TO OPERATE MACHINES

This patent application claims benefit of priority to GB patent application number 2112495.3, titled "METHOD FOR ASSISTING OR TRAINING OPERATORS TO OPERATE MACHINES", filed on Sep. 2, 2021, which is incorporated herein by reference.

TECHNICAL FIELD

The present disclosure relates to a method for assisting or training an operator of a machine (e.g., an earthmoving machine) to correctly and efficiently operate the machine.

BACKGROUND

Machines used in mining, earthmoving, industrial, and agricultural applications require considerable skills to operate. Such machines include, but are not limited to, wheel loaders, track-type tractors, motor graders, excavators, articulated trucks, and the like. Operators of such machines generally need to undergo extensive training and/or coaching in order to understand how to correctly and efficiently operate the machine.

Operator training and/or coaching efforts are generally human-led, making coaching efforts labor-intensive. Further, not all productive operators may be efficient teachers. Human-led coaching efforts may also be counter-productive in some cases. For example, it is quite common for a novice operator to become defensive when a peer provides them with feedback. Furthermore, most coaching techniques provide feedback after the completion of an exercise or one or more work shifts. Such coaching methods make the overall learning experience cumbersome as the novice operators may often be unable to accurately recall and correspond the feedback with their manner and style of operation for the older work shifts. Also, such coaching methods require that the novice operators unlearn the manner and style of operation they learned during the older work shifts and then shift to learn an altogether different manner and style of operation for the newer work shifts. Additionally, providing feedback at a later time also means that for those older works shifts, the novice operator may have deviated from an ideal manner and style of operation and may have not aptly utilized the machine's capabilities, and thus may have caused the machine to consume excess fuel and be less productive.

U.S. Publication No. 20150004572 relates to a method for coaching an operator of an earthmoving machine to perform an operation. The method includes receiving actual data related to the operation of the machine performed by the operator; determining a type of operation being performed based on the actual data; comparing the actual data to expected data; and providing notification of performance to the operator in real-time based on the comparison of the actual data to the expected data.

The present disclosure is directed to one or more improvements in the existing technology.

SUMMARY OF THE INVENTION

An example method for assisting an operator in operating a machine includes receiving, by a controller, a selection of a task of a plurality of tasks, each task associated with a corresponding movement pattern of the machine; sensing, by a sensor unit, at least one condition of at least one component of the machine associated with the selected task; and determining, by the controller, whether the condition is within a predetermined set of parameters associated with the selected task. The method further includes, in response to determining that the condition is not within the predetermined set of parameters, generating, by the controller, an audible or a haptic signal associated with at least one of the conditions or the at least one component.

An example system includes one or more processors, a machine, and one or more computer-readable storage media storing instructions that, when executed by the one or more processors, cause the system to perform operations. The operations include receiving, by a controller, a selection of a task of a plurality of tasks, each task associated with a corresponding movement pattern of the machine; sensing, by a sensor unit, at least one condition of at least one component of the machine associated with the selected task; and determining, by the controller, whether the condition is within a predetermined set of parameters associated with the selected task. The operations further include, in response to determining that the condition is not within the predetermined set of parameters, generating, by the controller, an audible or a haptic signal associated with at least one of the conditions or the at least one component.

An example non-transitory computer-readable media storing instructions which, when executed by one or more processors, perform operations. The operations include receiving, by a controller, a selection of a task of a plurality of tasks, each task associated with a corresponding movement pattern of the machine; sensing, by a sensor unit, at least one condition of at least one component of the machine associated with the selected task; and determining, by the controller, whether the condition is within a predetermined set of parameters associated with the selected task. The operations further include, in response to determining that the condition is not within the predetermined set of parameters, generating, by the controller, an audible or a haptic signal associated with at least one of the conditions or the at least one component.

DETAILED DESCRIPTION

Figure 1:
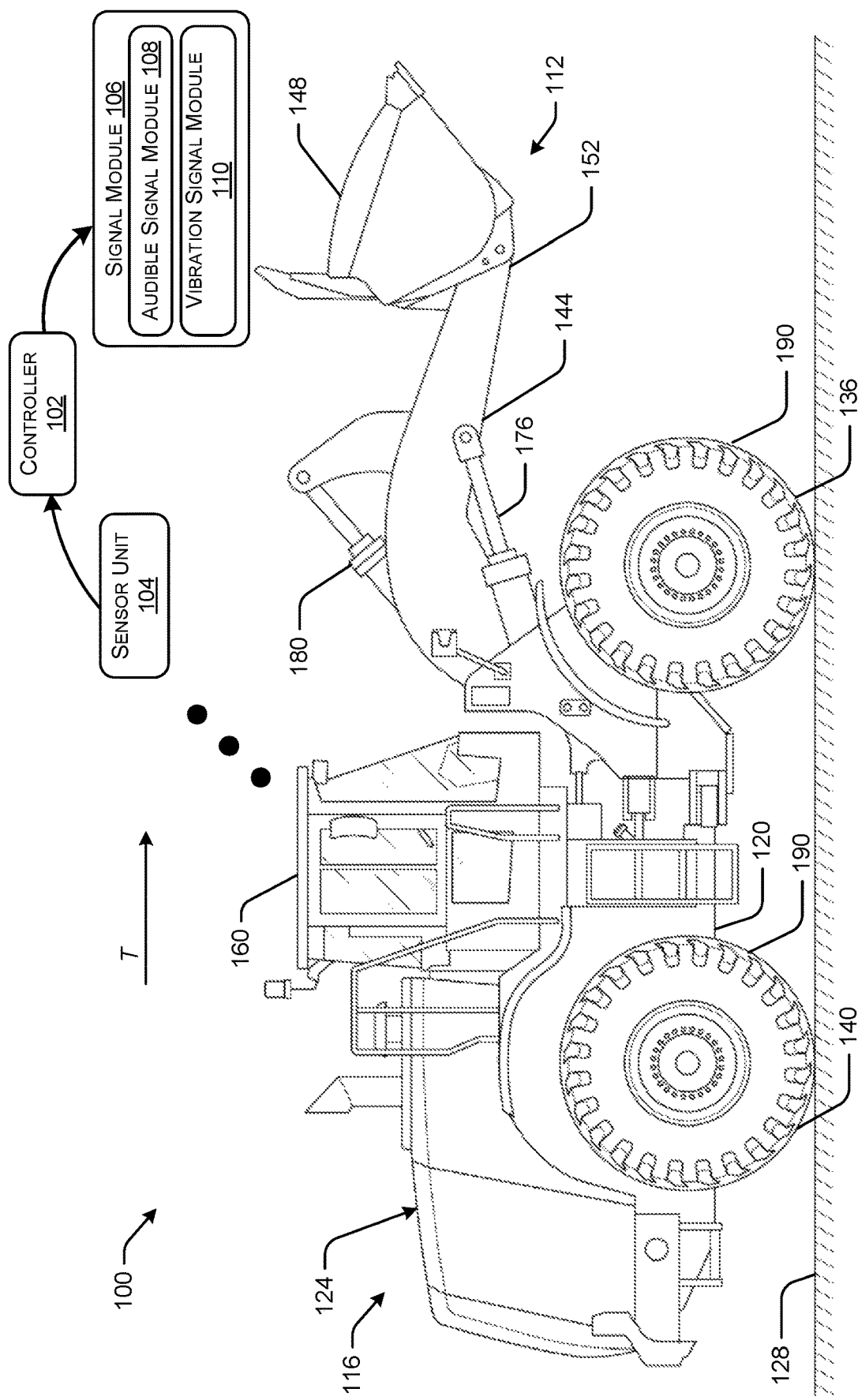
FIG. 1 is a side view of an exemplary machine, in accordance with one or more aspects of the present disclosure.

This disclosure generally relates to methods, systems, and techniques for assisting an operator in operating a machine. While specific parts described herein may be parts on machines, e.g., ground-engaging machines, earth-moving machines, or the like, the techniques described herein may be applicable to any number of other machines. Where possible, the same reference numerals are used through the drawings to refer to the same or like features.

FIG. 1 depicts an example of a machine 100 that implements techniques for assisting an operator in operating the machine according to aspects of this disclosure. The machine 100 is depicted as an earth moving machine, e.g., a wheel loader. However, it may be appreciated that the teachings of this disclosure are applicable with equal efficacy to other earth moving machines, including, but not limited to, track-type loaders, excavators, motor graders, skid steer loaders, compactors, scrapers, off-highway trucks, and the like. The machine 100 may include a forward end 112 and a rearward end 116. The rearward end 116 and the forward end 112 may be opposite to each other. The forward end 112 and the rearward end 116 may be defined in relation to an exemplary direction of travel, T, of the machine 100, with said direction of travel, T, being defined from the rearward end 116 towards the forward end 112.

The machine 100 may include a frame or a chassis 120. The chassis 120 may support a variety of machine parts, e.g., a power source 124 to power one or more functions of the machine 100. The power source 124 may include one or more of an internal combustion engine or a battery-powered electrical power source, although powertrains running from other known methods and sources may also be applicable. The chassis 120 may be supported on surface 128 by wheels (e.g., forward wheels 136 and rearward wheels 140) that may be powered by the power source 124 to move or rotate and facilitate machine propulsion. The machine 100 may include a lift arm assembly 144 (or a pair of lift arms) hinged or pivotably coupled to the chassis 120, as shown. An implement 148 (such as a bucket) may be provided at a distal end 152 of the lift arm assembly 144 (or at the forward end 112) to perform work, e.g., to scoop in material from a material bank. While the implement 148 is depicted as a bucket, it may be understood that the implement 148 may represent or include, but not limited to, blades, forks, and multiple varieties of buckets, such as toothed buckets, ejector buckets, side dump buckets, demolition buckets, and the like.

The chassis 120 may also support an operator cabin 160 that may station one or more operators of the machine 100 therein. The operator cabin 160 may house various devices accessing one or more of which may help an operator control the machine's movement and/or operation. For example, the operator cabin 160 may include one or more input devices, e.g., an input device that may be used and/or be actuated by an operator to control and/or perform one or more tasks with the machine 100 (e.g., for moving the machine 100 back and forth, for moving the implement 148, etc.).

The machine 100 may include one or more lift cylinders 176 and one or more tilt cylinders 180. The lift cylinders 176 may be hydraulically actuated cylinders and may include a cylinder-rod-based arrangement, which may be applied to raise and lower the implement 148 with respect to the surface 128. The lift cylinders 176 may be operatively coupled between the chassis 120 and the lift arm assembly 144. An extension of the lift cylinders 176 (i.e., an extension of the rod outward of the corresponding cylinder) may cause the implement 148 to be raised with respect to the surface 128 or the chassis 120 of the machine 100. Conversely, a retraction of the lift cylinders 176 (i.e., a retraction of the rod into the corresponding cylinder) may cause the implement 148 to be lowered with respect to the surface 128 or the chassis 120 of the machine 100.

The tilt cylinders 180 may be hydraulically actuated cylinders as well. The tilt cylinders 180 may be applied to rotate the implement 148 (e.g., the bucket) relative to the lift arm assembly 144. As an example, the tilt cylinders 180 may be operatively coupled between the implement 148 and the lift arm assembly 144 (or the chassis 120 of the machine 100), and may be retractable and extendable to appropriately cause the implement 148 to rotate or tilt with respect to the lift arm assembly 144.

In some examples, an operator operating the machine 100 may provide a selection of a task of one or more tasks via an input device. The input device may be representative of or may include, but is not limited to, one or more steering devices (not shown) that may be used to turn the forward wheels 136 and change machine direction during travel. The input device may also be representative of one or more pedals or levers (not shown) to accelerate and/or decelerate the machine 100. Additionally, the input device may also be representative of touch screens, joysticks, switches, and the like. In some embodiments, where the machine 100 may be operated autonomously or semi-autonomously, the input device may be omitted from operator cabin 160 and may instead be located remotely to the machine 100 or to the site of the machine's operations.

A controller 102 of the machine 100 may receive the selection of the task of the one or more tasks. In some examples, each task of the one or more tasks may be associated with a corresponding movement pattern of the machine 100. Examples of the one or more tasks may include, but not limited to, a task associated with lifting the implement 148 (e.g., a bucket), a task associated with moving the machine 100 from a first location to a second location (e.g., backing up the machine 100 from a material bank to the second location), a task associated with moving the machine 100 from the second location to a third location (e.g., moving the machine 100 from the second location to a dumpsite), a task associated with applying a brake under propulsion, a task associated with steering the machine 100 with the implement 148 high in the air, etc.

In some examples, a sensor unit 104 of the machine 100 may sense at least one condition of at least one component of the machine 100 associated with the selected task. The sensor unit 104 may comprise a plurality of sensors for detecting a plurality of conditions. For example, the sensor unit 104 may comprise an implement position sensor for detecting a position of the implement 148, an accelerometer for detecting acceleration and deceleration of the machine 100, a load sensor for detecting a load on the implement 148, etc. The controller 102 of the machine 100 may determine whether the condition is within a predetermined set of parameters associated with the selected task.

In one example, the selected task may include a task associated with lifting implement 148 (e.g., a bucket), and the sensor unit 104 may sense an initial position of the implement 148 relative to the surface 128 on which the machine 100 travels. The predetermined set of parameters includes an ideal initial position of the implement 148 and an allowable deviation in the position of the implement 148 from the ideal initial position of the implement 148. The controller 102 of the machine 100 may determine whether the initial position of the implement 148 is within the allowable deviation.

In another example, the selected task may include a task associated with moving from a first location to a second location (e.g., backing up the machine 100 from a material bank to the second location), and the sensor unit 104 may sense a movement of a wheel (e.g., the forward wheel 136, the rearward wheel 140) of the machine 100. The predetermined set of parameters includes a first location and a second location. The controller 102 of the machine 100 may determine a relative location of the machine 100 based on the movement and determine whether the machine 100 is moving from the first location to the second location within a predetermined time. In some examples, moving from the first location to the second location includes moving the machine 100 in one of a forward direction or a reverse direction.

In another example, the selected task may include a task associated with moving the machine 100 from the second location to a third location (e.g., moving the machine 100 from the second location to a dumpsite), and the sensor unit 104 may sense a movement of a wheel (e.g., the forward wheel 136, the rearward wheel 140) of the machine 100. The predetermined set of parameters includes a predetermined distance and an allowable deviation in distance from the predetermined distance. The controller 102 of the machine 100 may determine a relative location of the machine 100 based on the movement and determine whether the machine 100 travels the predetermined distance within the allowable deviation.

In another example, the selected task may include a task associated with applying a brake under propulsion, and the sensor unit 104 may sense a movement of a wheel (e.g., the forward wheel 136, the rearward wheel 140) of the machine 100, an engine throttle, and a braking amount applied to a brake of the machine 100. The predetermined set of parameters includes a predetermined maximum braking amount of the machine 100 with respect to an engine throttle amount. The controller 102 of the machine 100 may determine a braking amount of the machine 100 based on the movement and determine whether the braking amount of the machine 100 exceeds the maximum braking amount.

In another example, the selected task may include a task associated with steering the machine 100 with the implement 148 high in the air, and the sensor unit 104 may sense a lateral acceleration of the machine 100, a movement of a wheel (e.g., the forward wheel 136, the rearward wheel 140) of the machine 100, a steering angle of the wheel, a position of the implement 148, and a load on the implement 148. The predetermined set of parameters includes a predetermined lateral acceleration determined based on a speed of the machine 100, a turning radius of the machine 100, a position of the implement 148, and a load on the implement 148. The controller 102 of the machine 100 may determine whether the sensed lateral acceleration is below the predetermined lateral acceleration.

In response to determining that the condition is not within the predetermined set of parameters, the controller 102 of the machine 100 may generate a signal associated with at least one of the condition or the at least one component. For example, the operator cabin 160 may include a signal module 106.

In some examples, the controller 102 of the machine 100 may generate an audible signal. For example, the signal module 106 may include an audible signal module 108 configured to generate audible signals. In one example, the series of sounds (e.g., beeping, discord or disharmonious sound, etc.) may be produced by the audible signal module 108. In some embodiments, the audible signals may include a human voice (e.g., a simulated or a pre-recorded human voice) that may be produced by the audible signal module 108. In some embodiments, the audible signals may also mimic the sound emitted from any part of the machine 100 (e.g., grinding sound, over-stressed sound, the sound of the power source 124 such as an internal combustion engine). In some embodiments, the audible signals may include musical progressions or pre-recorded and/or synthesized sounds, that may be comfortable for the operator to hear and experience, while also being assisted, coached, and/or trained, to operate the machine 100 at the same time. A variety of such audible signals may be contemplated by someone of skill in the art, and the examples of audible signals discussed above and the nature of their production (e.g., their frequency) and their type need not be viewed as being limited or exhaustive. Similar discussions may be contemplated for the haptic signals, as well.

In some examples, the controller 102 of the machine 100 may also generate a haptic signal. For example, the signal module 106 may include a vibration signal module 110. The vibration signal module 110 may be configured to vibrate to provide haptic signals or feedback to an operator.

Furthermore, in some examples, the controller 102 of the machine 100 may increase the severity of the audible signal or the haptic signal as the condition increasingly deviates from the predetermined set of parameters. In some examples, the controller 102 of the machine 100 may decrease the severity of the audible signal or the haptic signal as the condition increasingly approaches the predetermined set of parameters.

Figure 2:
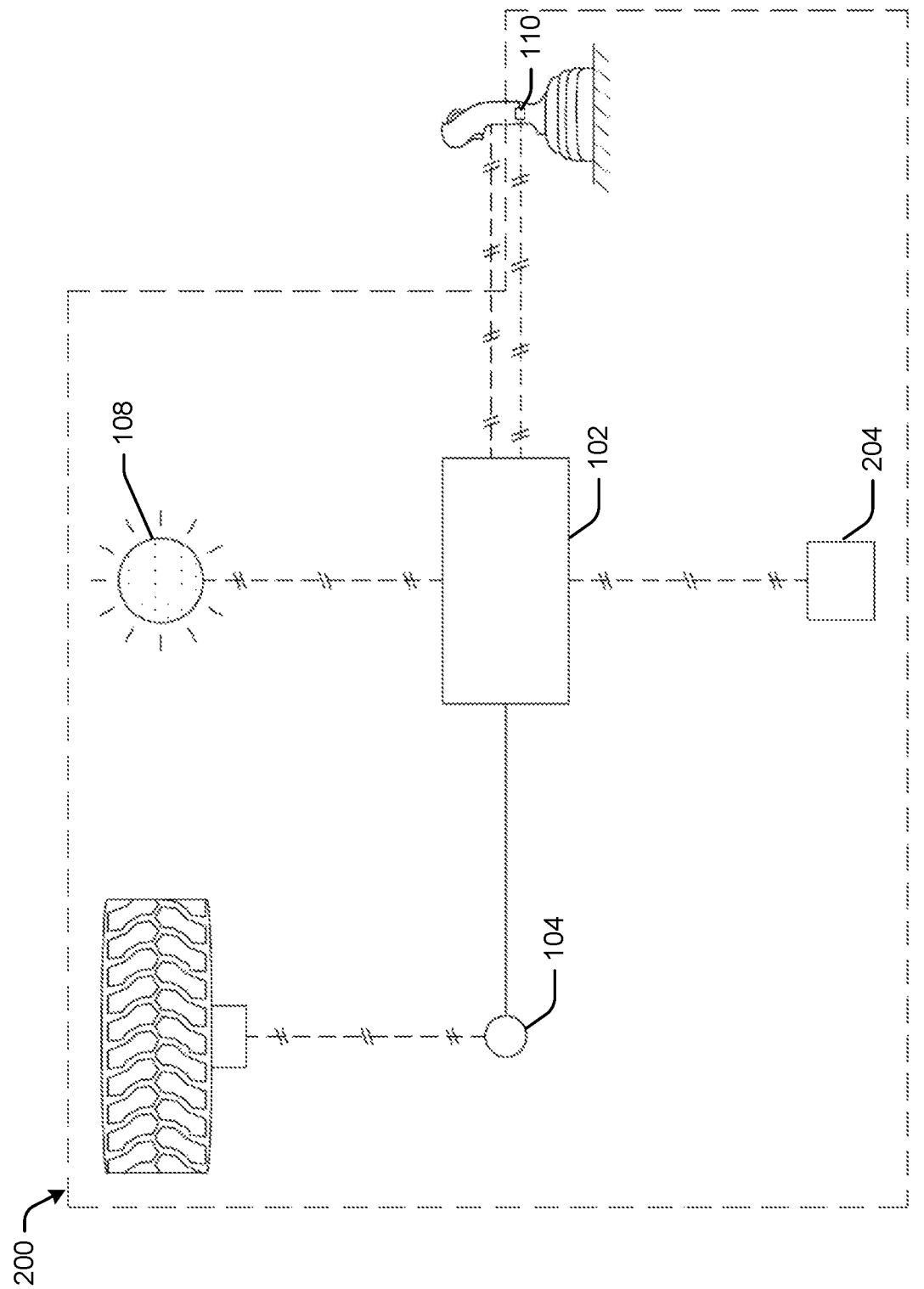
FIG. 2 is a schematic view of a system for assisting or training an operator to operate the machine, in accordance with one or more aspects of the present disclosure.

FIG. 2 specifically shows a system 200 for assisting or training an operator to operate the machine 100, in accordance with one or more aspects of the present disclosure. The system 200 includes the controller 102, the sensor unit 104, and the audible signal module 108. Details related to each of the controller 102, the sensor unit 104, and the audible signal module 108, shall be discussed in the forthcoming description below. The vibration signal module 110 may be part of the system 200, as well. Also, to discuss one or more aspects of the present disclosure, certain parts of the machine 100 discussed above, e.g., each of the wheels of the forward wheels 136 and rearward wheels 140, each of the lift cylinders 176 and the tilt cylinders 180, each of the pedals (not shown) of the machine 100 to accelerate and/or brake the machine 100, and one or more other parts of the machine 100 that may be movable to execute a selected task of one or more tasks, may be referred to as or be categorized as a 'component 190' (as shown in FIG. 1).

The sensor unit 104 may be configured to sense one or more parameters associated with the component 190. According to one exemplary scenario, the component 190 may be representative of the implement 148 (e.g., a bucket) attached to the machine 100, and it may be contemplated that the sensor unit 104 may sense one or more parameters associated with said component (i.e., the implement 148). For example, one of the parameters associated with the implement 148 may include a position of the implement 148 relative to the surface 128 on which the machine 100 travels. As another example, one of the parameters associated with the implement 148 may include a load of the implement 148. The component 190 may further be representative of a wheel of the machine 100 (i.e., the forward wheel 136, the rearward wheel 140). As an example, the sensor unit 104 may sense a movement of the wheel of the machine 100. As another example, the sensor unit 104 may sense a lateral acceleration of the machine 100. As another example, the sensor unit 104 may sense a steering angle of the wheel (e.g., the forward wheel 136, the rearward wheel 140).

The audible signal module 108 may include one or more speakers that may output sound or audible signals. At least one of the speakers of the audible signal module 108 may be located relatively close to the operator so as to allow the operator to receive and/or gather the sound output clearly. For example, the audible signal module 108 may be installed within the operator cabin 160 where an operator may be stationed during machine operations. However, in cases where the machine 100 is an autonomous machine or a semi-autonomous machine and/or is operable remotely, it is possible for the audible signal module 108 or one or more speakers of the audible signal module 108 to be located at the remote location from where an operator may be controlling one or more functions and/or operations of the machine 100.

The vibration signal module 110 may include one or more vibrators that may output haptic signals. In one example, the vibration signal module 110 may be either connected externally to an input device. Alternatively, the vibration signal module 110 may be configured within other devices and/or parts of the machine 100, such as seats (not shown) on which an operator may be seated during operations, or one or more other devices that an operator may access (e.g., physically touch) during operations. The vibration signal module 110 may be configured to vibrate to provide haptic signals or feedback to an operator through the device or apparatus that vibration signal module 110 may be connected, coupled with, or integrated with.

The controller 102 may be communicably coupled to each of one or more input devices, the sensor unit 104, the audible signal module 108, and the vibration signal module 110. Further, the controller 102 may also be communicably coupled to a memory 204. For example, the memory 204 may be external to the controller 102, although it is possible for the memory to be configured within and be part of the controller 102, in some cases.

The controller 102 may be additionally communicably coupled to a variety of other interfaces and/or devices through which various commands may be fed into the controller 102. For example, a command may correspond to a selection of a task among one or more tasks performable by the machine 100.

Figure 3:
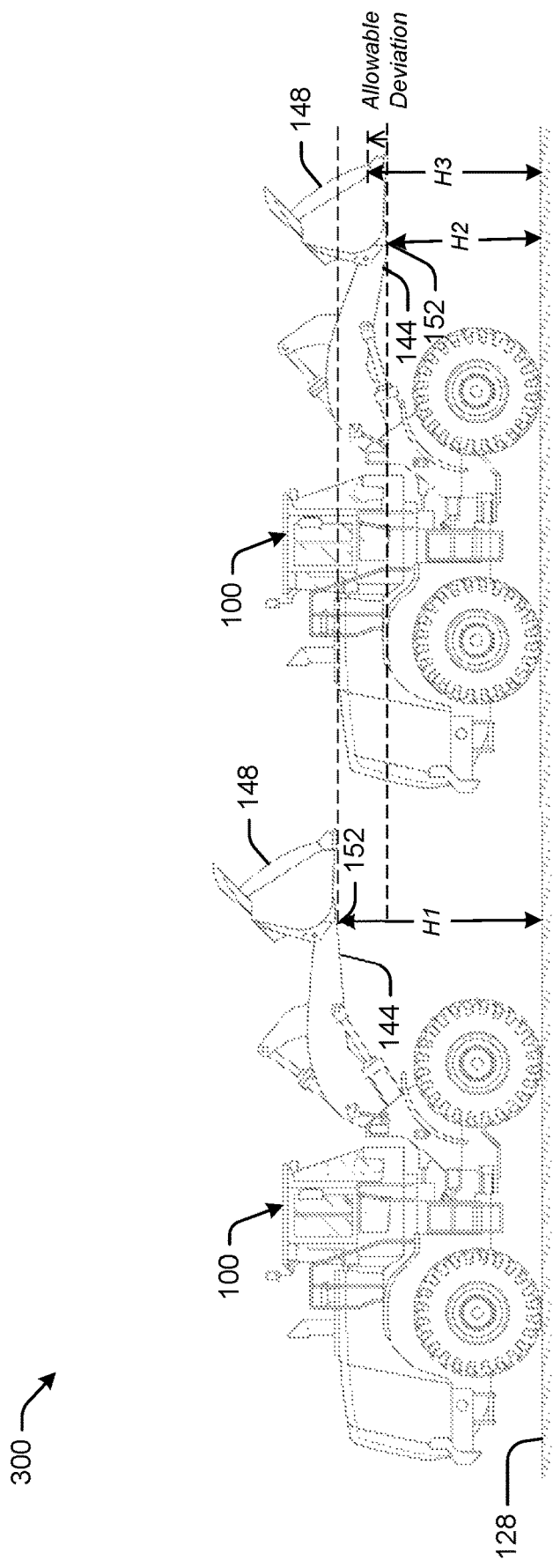
FIG. 3 is a view illustrating an exemplary task, in accordance with one or more aspects of the present disclosure.

FIG. 3 is a view illustrating an exemplary task in accordance with one or more aspects of the present disclosure. In one exemplary scenario 300, the task may be associated with lifting the implement 148 (e.g., a bucket).

According to the exemplary scenario 300, the component may be representative of the implement 148 (e.g., a bucket) attached to the machine 100, and it may be contemplated that the sensor unit 104 may sense one or more parameters associated with said component (i.e., the implement 148). For example, one of the parameters associated with the implement 148 may include an initial position H1 of the implement 148 relative to the surface 128 on which the machine 100 travels. The implement 148 is attached to the distal end 152 of the lift arm assembly 144, and the initial position H1 of the implement 148 may be defined as a distance between the surface 128 and the distal end 152. The sensor unit 104 may be mounted to the distal end 152 of the lift arm assembly 144 so as to sense the initial position H1 of the implement 148 relative to the surface 128 on which the machine 100 travels. Such techniques of sensing positions, along with the myriad of other ways of sensing positions, are well known and contemplatable by those of skill in the art, and thus shall not be discussed any further in the present disclosure.

The controller 102 may determine, based on the selected task, a predetermined set of parameters associated with the selected task. According to the exemplary scenario 300, the predetermined set of parameters includes an ideal initial position H2 of the implement 148 and an allowable deviation in position of the implement 148 from the ideal initial position H2 of the implement 148. For example, the allowable deviation may include a positive deviation value (e.g., 100 millimeters (mm), 150 mm, 200 mm, etc.). Based on the allowable deviation and the ideal position H2 of the implement 148, the controller 102 of the machine 100 may determine an allowable deviation scope of the ideal position H2 (e.g., from H2 to H3). For example, with the allowable deviation value being 150 mm, if the ideal position H2 is 2700 mm, then the allowable deviation scope of the ideal position is 2700 mm to 2700+150 mm (i.e., from 2700 mm to 2850 mm). As another example, the allowable deviation may include a positive deviation percentage (e.g., 5%, 10%, 15%, etc.). For example, with the allowable deviation of the ideal position H2 being a positive deviation of 5 percent as the ideal position H2, if the ideal position H2 is 2700 mm, then the allowable deviation scope of the ideal position is 2700 mm to 2700×(1+5%) (i.e., from 2700 mm to 2835 mm).

The controller 102 may receive the initial position H1 of the implement 148 from the sensor unit 104 and determine whether the initial position H1 of the implement 148 is within the allowable deviation scope of the ideal position H2. In response to determining that the initial position H1 of the implement 148 is not within the allowable deviation scope of the ideal position H2, the controller 102 may generate an audible signal or a haptic signal. The audible signal or the haptic signal may provide the operator with an indication as to where ideally the implement 148 of the machine 100 needs to be moved down so as to reach the ideal position H2 and to prevent the machine 100 from tipping over.

Figure 4:
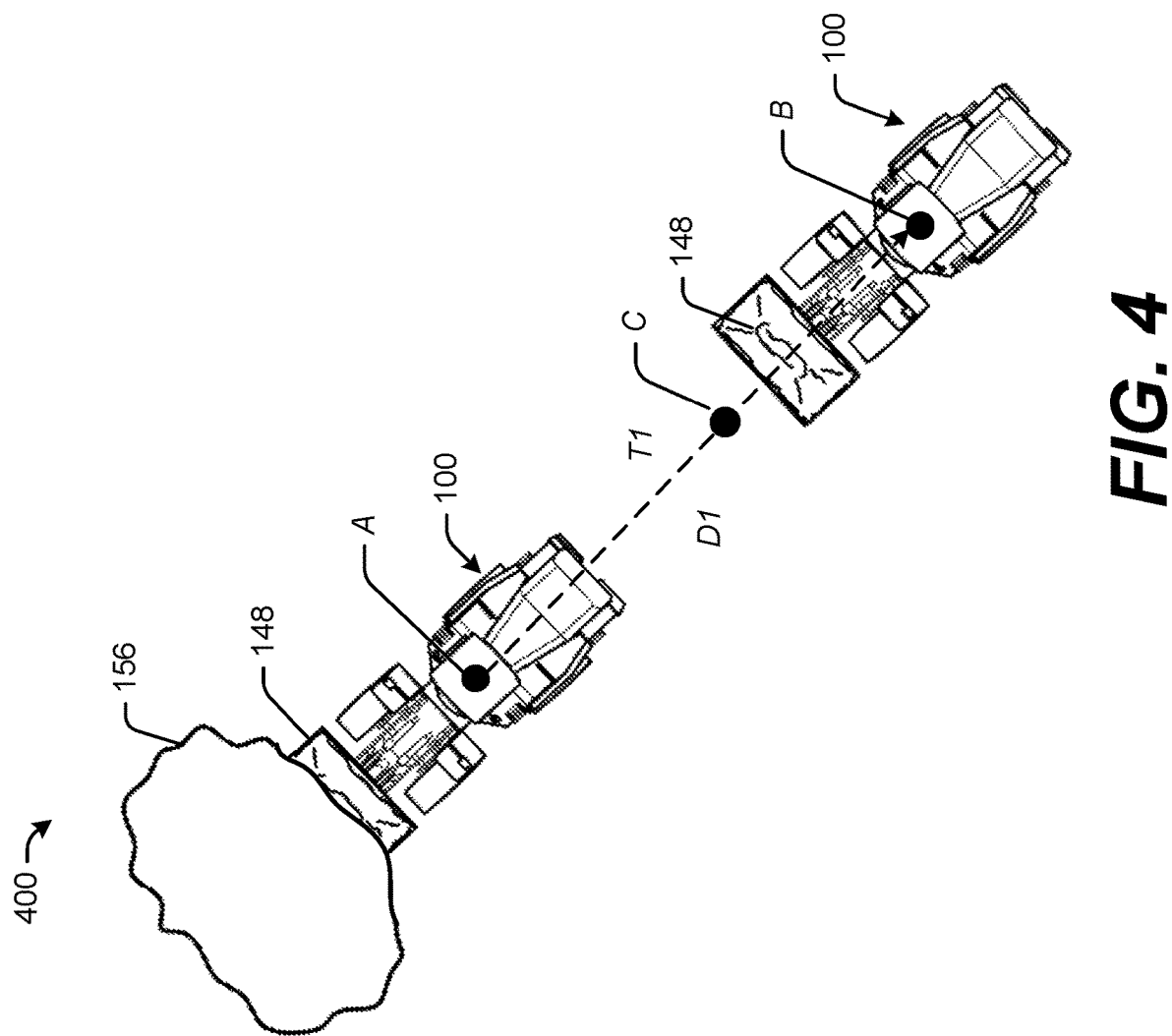
FIG. 4 is a view illustrating another exemplary task, in accordance with one or more aspects of the present disclosure.

FIG. 4 is a view illustrating an exemplary task in accordance with one or more aspects of the present disclosure. In one exemplary scenario 400, the task may be associated with moving (e.g., backing up) the machine 100 from a material bank 156 to a second location, such as moving the machine 100 from a first location A to a second location B (in a direction T1) to carry scooped materials in the implement 148 from the material bank 156 to the second location B.

According to the exemplary scenario 400, the sensor unit 104 may sense one or more parameters associated with a wheel of the machine 100 (i.e., the forward wheel 136, the rearward wheel 140 (not shown in FIG. 4)). As an example, the sensor unit 104 may sense a movement of the wheel of the machine 100. The sensor unit 104 may be positioned with respect to the wheel of the machine 100 to sense the movement (or rotation) of the wheel. Such manner of sensing wheel rotations, along with the myriad of other ways of sensing wheel rotations, are well known and contemplatable by those of skill in the art, and thus shall not be discussed any further in the present disclosure.

The controller 102 may determine, based on the selected task, a predetermined set of parameters associated with the selected task. According to the exemplary scenario 400, the predetermined set of parameters includes the first location A to the second location B. As the machine 100 moves from the first location A to the second location B, the controller 102 may determine a relative location C of the machine 100 based on the movement detected by the sensor unit 104. The controller 102 may determine the machine 100 reached the second location B when the relative location C of the machine 100 matches the second location B.

The controller 102 may further determine a time for the machine 100 to move from the first location A to the location B and determine whether the time for the machine 100 to move from the first location A to the second location B is within a predetermined time. In response to determining that the time for the machine 100 to move from the first location A to the second location B is not within the predetermined time, the controller 102 may generate an audible signal or a haptic signal. The audible signal or the haptic signal may provide the operator with an indication as to where ideally the speed of the machine 100 needs to be sped up so as to move from the first location A to the second location B within the predetermined time. The audible signal or haptic signal may further help the operator to perform the task more efficiently.

Figure 5:
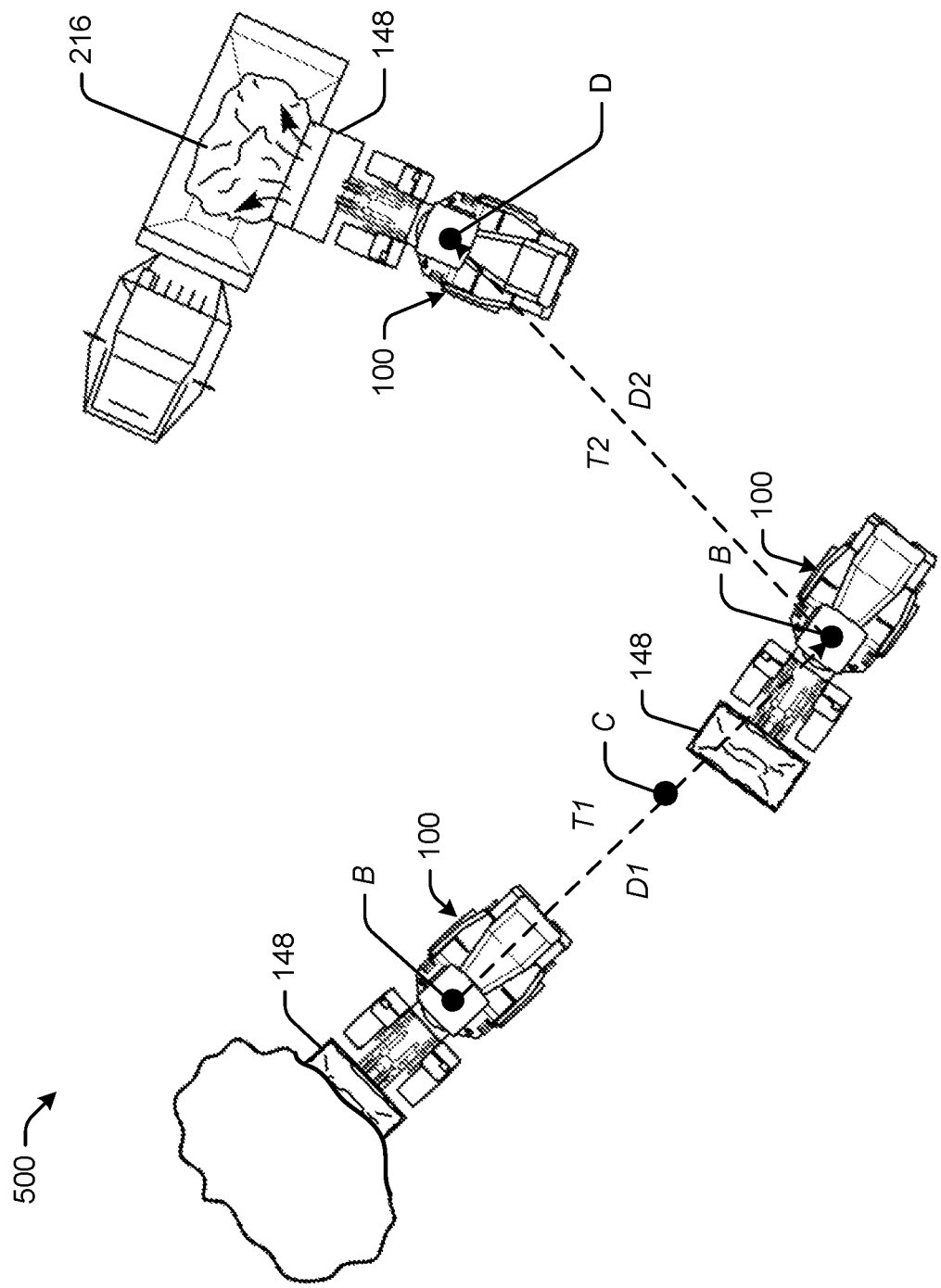
FIG. 5 is a view illustrating another exemplary task, in accordance with one or more aspects of the present disclosure.

FIG. 5 is a view illustrating an exemplary task in accordance with one or more aspects of the present disclosure. In one exemplary scenario 500, the task may be associated with moving the machine 100 from a material bank 156 towards a dumpsite 216 to release or transfer the scooped material in the implement 148. For example, the machine 100 may first back up a first distance D1 (in a direction T1) from the first location A to a second location B and move a second distance D2 (in a direction T2) from the second location B to a fourth location D to release or transfer the scooped material to the dumpsite 216.

According to the exemplary scenario 500, the sensor unit 104 may sense one or more parameters associated with a wheel of the machine 100 (i.e., the forward wheel 136, the rearward wheel 140 (not shown in FIG. 5)). As an example, the sensor unit 104 may sense a movement of the wheel of the machine 100.

The controller 102 may determine, based on the selected task, a predetermined set of parameters associated with the selected task. According to the exemplary scenario 500, the predetermined set of parameters includes a predetermined distance and an allowable deviation in distance from the predetermined distance. In one example, the predetermined distance may include the first distance D1, and the allowable deviation may include a positive deviation value (e.g., 0.2 meters (m), 0.5 m, 1 m, etc.) and a negative deviation value (e.g., −0.2 m, −0.5 m, −1 m, etc.). Based on the allowable deviation and the first distance D1, the controller 102 of the machine 100 may determine an allowable deviation scope of the first distance D1. As another example, the predetermined distance may include the second distance D2, and the allowable deviation may include a positive deviation percentage (e.g., 5%, 10%, 15%, etc.) and a negative deviation percentage (e.g., −5%, −10%, −15%, etc.). The controller 102 of the machine 100 may determine an allowable deviation scope of the second distance D2 based on the allowable deviation and the second distance D2.

As the machine 100 moves from the material bank 156 towards the dumpsite 216, the controller 102 may determine a relative location C of the machine 100 based on the movement. The controller 102 may determine whether the machine 100 reaches the allowable deviation scope of the second location B or the allowable deviation scope of the fourth location D based on the relative location C of the machine 100. In response to determining that the machine 100 travels the predetermined distance within the allowable deviation, the controller 102 may generate an audible signal. The audible signal provides the operator with an indication as to where ideally the machine 100 needs to be moved forward or backward so as to reach the dumpsite 216.

Figure 6:
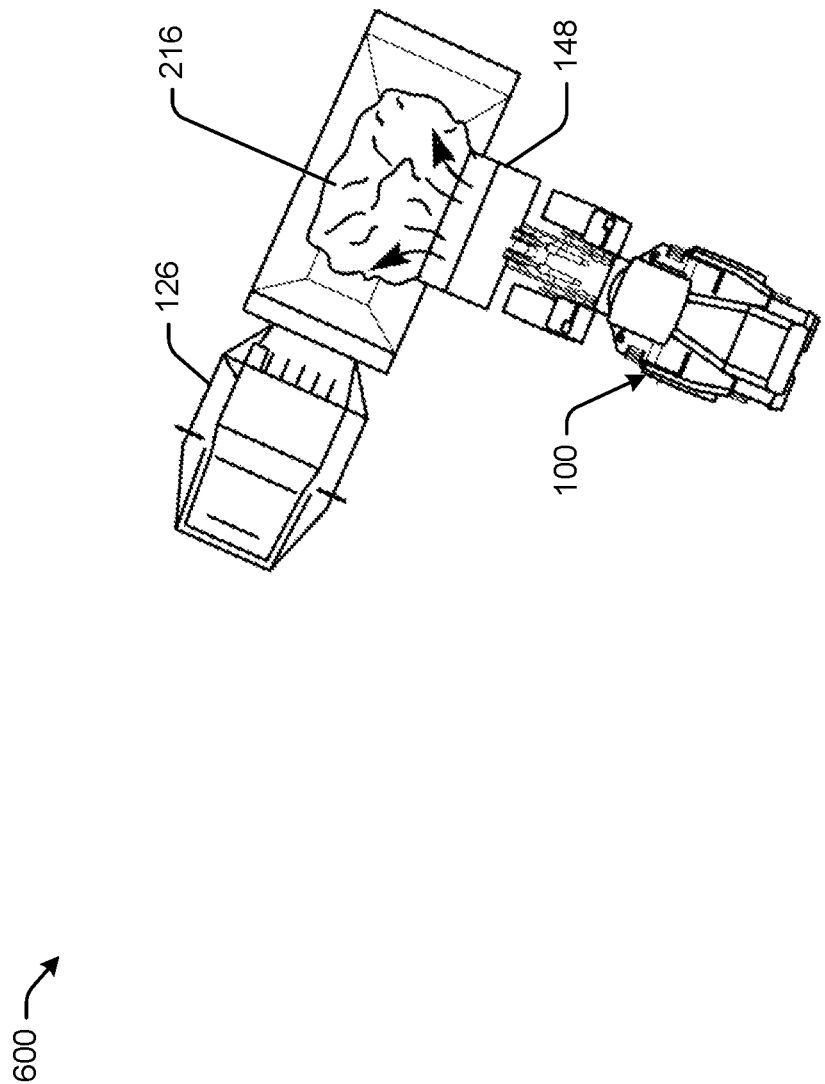
FIG. 6 is a view illustrating another exemplary task, in accordance with one or more aspects of the present disclosure.

FIG. 6 is a view illustrating an exemplary task in accordance with one or more aspects of the present disclosure. In one exemplary scenario 600, the task may be associated with applying a brake under propulsion, such as applying a brake 126 as the machine 100 move close to the dumpsite 216 to release or transfer scooped materials in the implement 148.

According to the exemplary scenario 600, the sensor unit 104 may sense one or more parameters associated with a wheel of the machine 100 (i.e., the forward wheel 136, the rearward wheel 140 (not shown in FIG. 6)). As an example, the sensor unit 104 may sense a movement of the wheel of the machine 100. The sensor unit 104 may further sense one or more parameters associated with the brake 126 of the machine 100. As an example, the sensor unit 104 may sense a braking amount applied to the brake 126 of the machine 100.

The controller 102 may determine, based on the selected task, a predetermined set of parameters associated with the selected task. According to the exemplary scenario 600, the predetermined set of parameters includes a predetermined maximum braking amount with respect to an engine throttle amount of the machine 100.

The controller 102 may further determine a braking amount of the machine 100 based on the movement and determine whether the braking amount of the machine 100 is above the maximum braking amount. In response to determining that the braking amount of the machine 100 is above the maximum braking amount, the controller 102 may generate an audible or a haptic signal. The audible or the haptic signal may provide the operator with an indication as to where the braking amount applied to the brake 126 needs to be reduced so as to prevent brake damage and to extend brake life.

Figure 7:
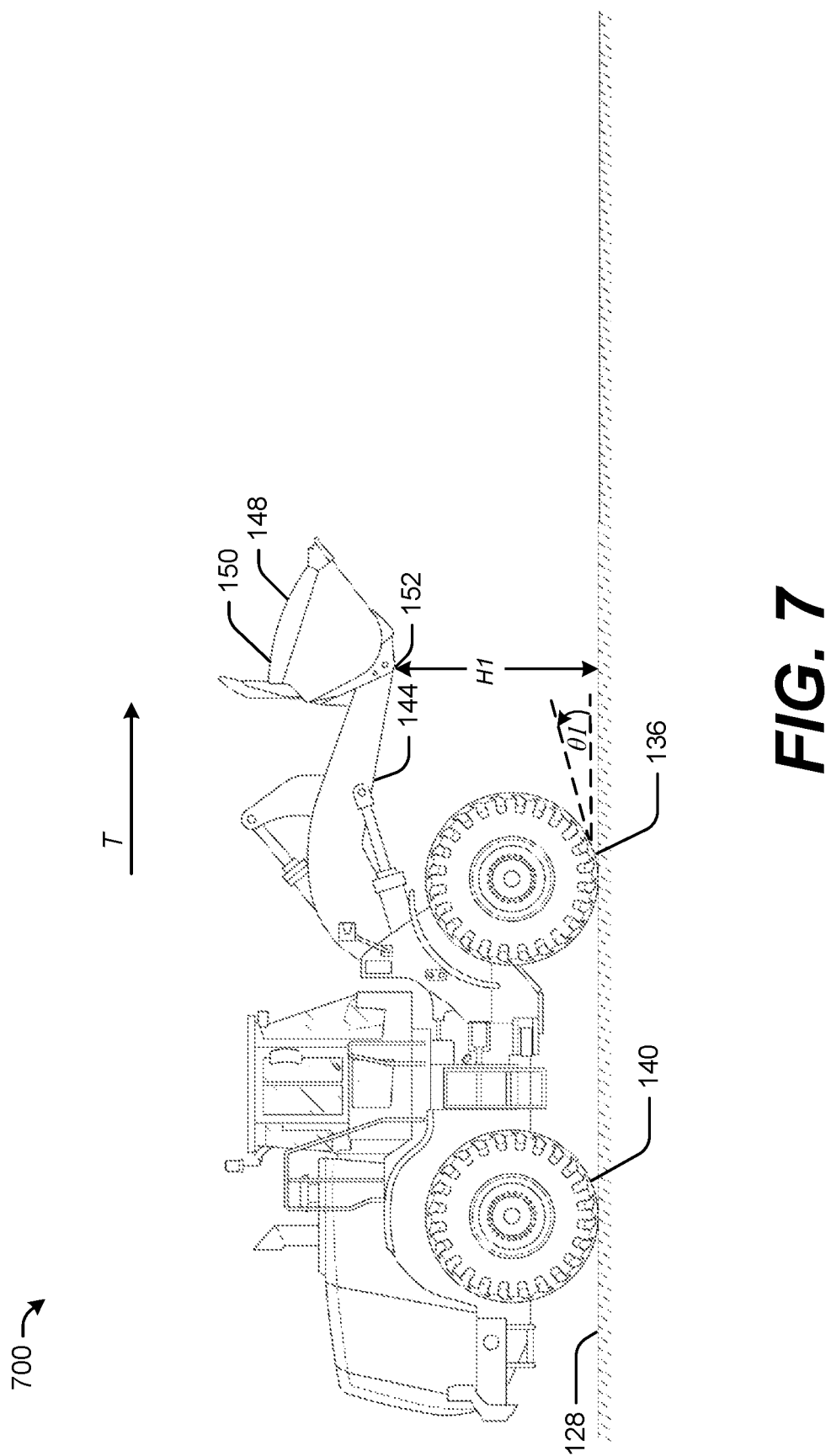
FIG. 7 is a view illustrating another exemplary task, in accordance with one or more aspects of the present disclosure.

FIG. 7 is a view illustrating an exemplary task in accordance with one or more aspects of the present disclosure. In one exemplary scenario 700, the task may be associated with steering the machine 100 with the implement 148 high in the air.

According to the exemplary scenario 700, the component may be representative of the implement 148 (e.g., a bucket) attached to the machine 100, and it may be contemplated that the sensor unit 104 may sense one or more parameters associated with said component (i.e., the implement 148). For example, one of the parameters associated with the implement 148 may include a position H1 of the implement 148 relative to the surface 128 on which the machine 100 travels. The implement 148 is attached to the distal end 152 of the lift arm assembly 144, and the position H1 of the implement 148 may be defined as a distance between the surface 128 and the distal end 152. As another example, one of the parameters associated with the implement 148 may include a load 150 of the implement 148. The sensor unit 104 may sense one or more parameters associated with a wheel of the machine 100 (i.e., the forward wheel 136, the rearward wheel 140). As an example, the sensor unit 104 may sense a movement of the wheel of the machine 100. As another example, the sensor unit 104 may sense a lateral acceleration of the machine 100. As another example, the sensor unit 104 may sense a steering angle θ1 of the wheel (e.g., the forward wheel 136, the rearward wheel 140).

The controller 102 may determine, based on the selected task, a predetermined set of parameters associated with the selected task. According to the exemplary scenario 700, the predetermined set of parameters includes a predetermined lateral acceleration. In some examples, the predetermined lateral acceleration may be determined based on a speed of the machine 100, a turning radius of the machine 100, a position of the implement 148, and a load on the implement 148.

The controller 102 may further receive the sensed lateral acceleration from the sensor unit 104 and determine whether the sensed lateral acceleration is below the predetermined lateral acceleration. In response to determining that the sensed lateral acceleration of the machine 100 is not below the predetermined lateral acceleration, the controller 102 may generate an audible signal. The audible signal provides the operator with an indication as to where ideally the lateral acceleration of the machine 100 needs to be reduced so as to prevent the machine 100 from tipping over.

The above discussed controller functionality allows novice operators to be assisted or trained both onsite (e.g., in a case where a novice operator may gain an on-the-job assistance or training by operating the machine 100 in situ) and offsite (e.g., in a case where a novice operator may gain an on-the-job assistance or training by operating the machine 100 from a remote site). Additionally, the aforementioned controller functionality may also allow novice operators to be assisted or trained through a simulation exercise as well (e.g., see simulation exercise environment 800, FIG. 8), but which need not be an actual on-the-job operational event.

Figure 8:
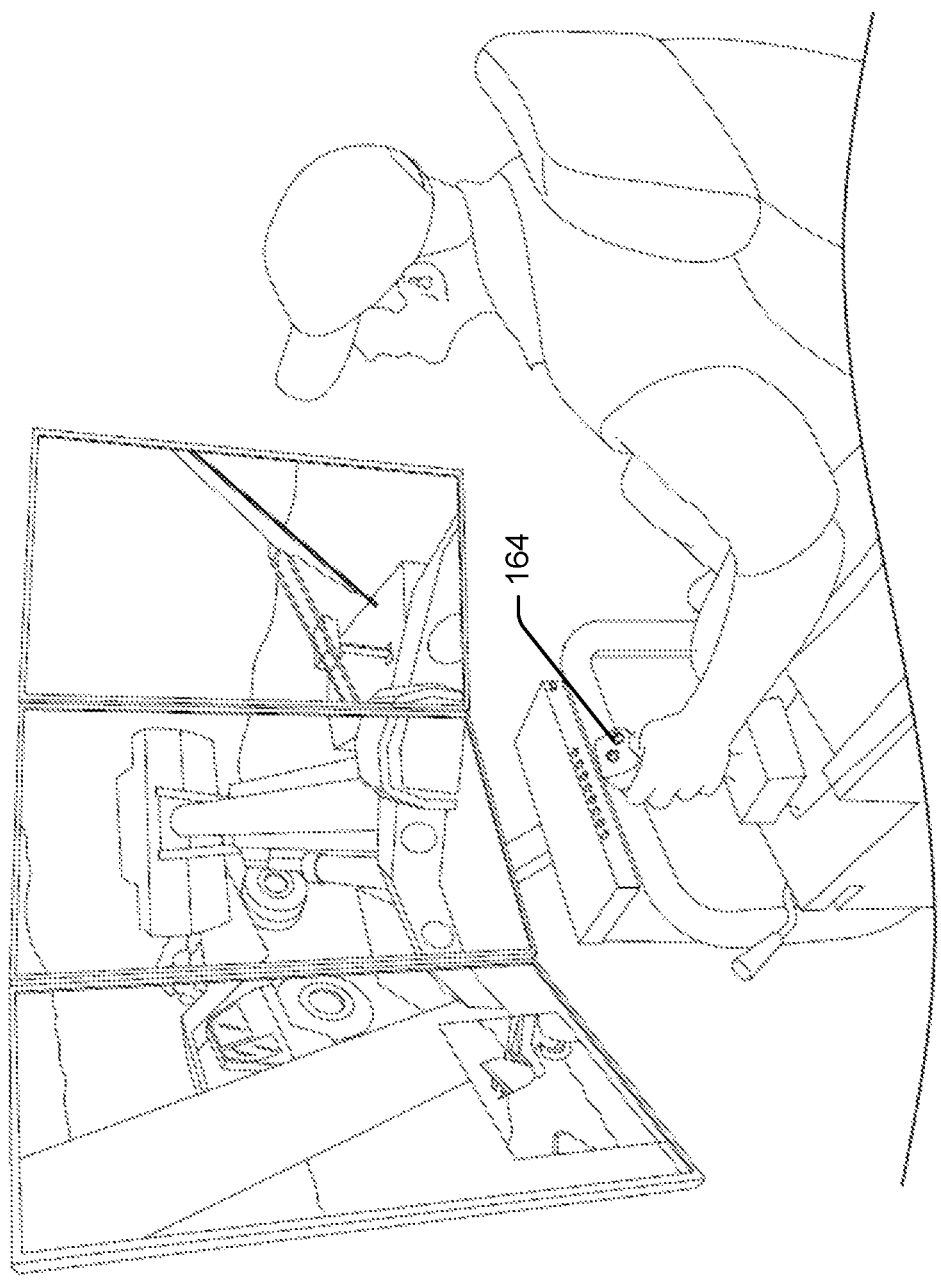
FIG. 8 is a view illustrating an exemplary environment for assisting or training an operator to operate the machine, in accordance with one or more aspects of the present disclosure.

FIG. 8 is a view illustrating an exemplary environment 800 for assisting or training an operator to operate the machine, in accordance with one or more aspects of the present disclosure.

In the simulation exercise environment 800, the component 190 may differ from the forward wheel 136 given the absence of the actual machine 100 at the simulation exercise environment 800, and may instead include another component 190 (e.g., a component 190 which may be physically accessible to the novice operator desiring to be assisted or trained to operate the machine 100 at the simulation exercise environment 800). As an example, the component 190 in the simulation exercise environment 800 may include pedals, etc., that may be available at the simulation exercise environment 800, and which may correspond to the actual devices in the machine 100 to simulate their actual functions (acceleration, braking, etc.) through the simulation exercise.

The simulation exercise environment 800 may include a system, which includes a sensor unit and a controller. The sensor unit of the simulation exercise environment 800 may be similar to the sensor unit 104 and may be configured to sense a movement of the corresponding/applicable component 190 of the simulation exercise environment 800. The controller of the simulation exercise environment 800 may be similar to the controller 102.

The controller 102 may be communicably coupled to the machine's electronic control module (ECM) (not shown), such as a safety module or a dynamics module, or may be configured as a stand-alone entity. Optionally, the controller 102 may be integral and be one and the same as one of the ECMs of the machine 100. Further, the controller 102 may be a microprocessor-based device, and/or may be envisioned as an application-specific integrated circuit, or other logic devices, which provide controller functionality, and such devices being known to those with ordinary skills in the art.

In one example, it is possible for the controller 102 to include or be representative of one or more controllers having separate or integrally configured processing units to process a variety of data (or input or commands). In some embodiments, a transmission of data between the controller 102 and various other controllers and/or the sensor unit 104, the audible signal module 108, the vibration signal module 110, and an input device 164, may be facilitated wirelessly or through a standardized CAN bus protocol. Further, the controller 102 may be optimally suited for accommodation within certain machine panels or portions from where the controller 102 may remain accessible for ease of use, service, calibration, and repairs.

Processing units of the controller 102, to convert and/or process various input, commands, signals, and/or the like, may include, but are not limited to, an X86 processor, a Reduced Instruction Set Computing (RISC) processor, an Application Specific Integrated Circuit (ASIC) processor, a Complex Instruction Set Computing (CISC) processor, an Advanced RISC Machine (ARM) processor, or any other processor.

Examples of the memory 204 may include a hard disk drive (HDD), and a secure digital (SD) card. Further, the memory 204 may include non-volatile/volatile memory units such as a random-access memory (RAM)/a read-only memory (ROM), which may include associated input and output buses. The memory 204 may be configured to store various other instruction sets for various other functions of the machine 100, along with the set of instructions, discussed above.

Figure 9:
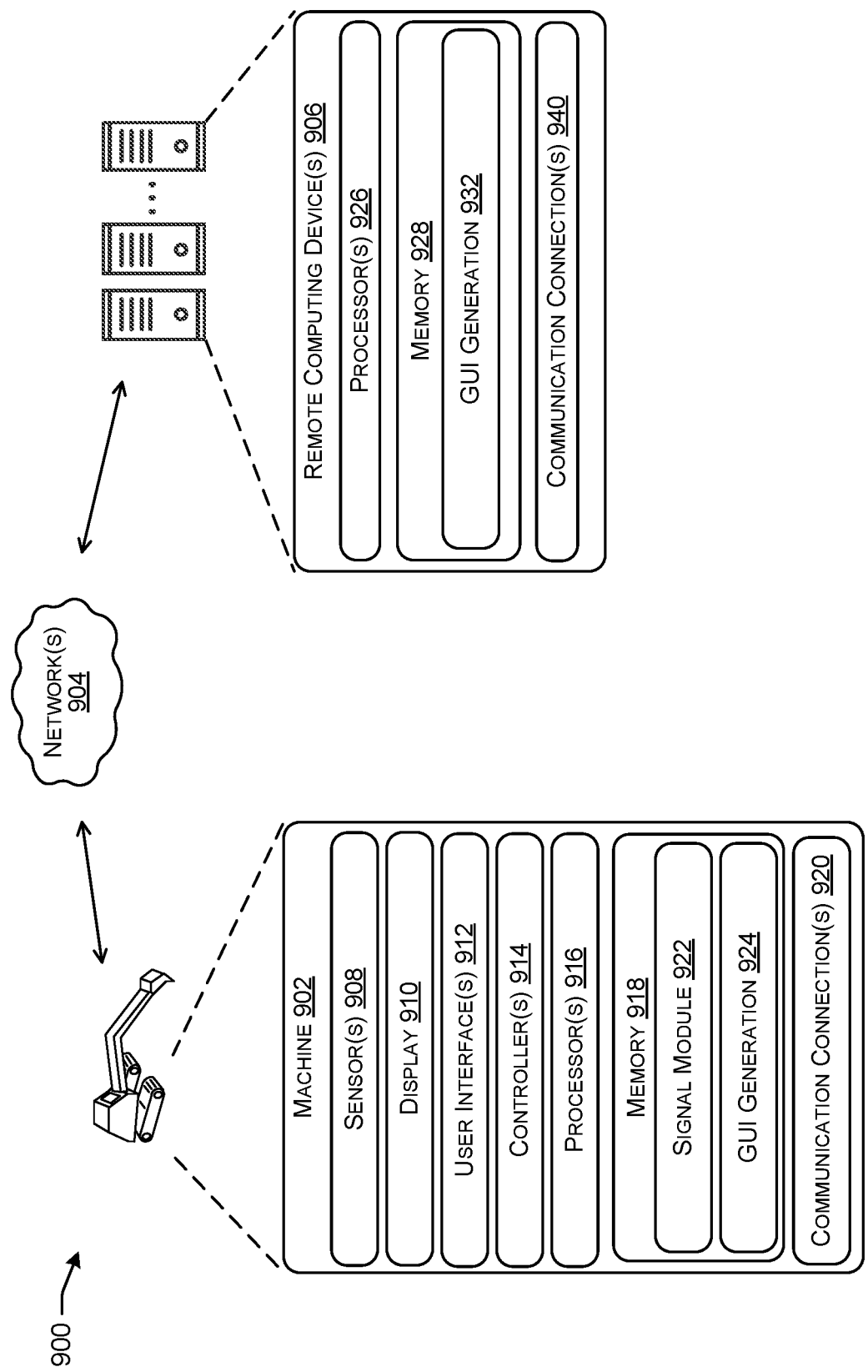
FIG. 9 is an example computing environment for assisting or training operators to operate the machine, in accordance with implementations described herein.

FIG. 9 is a diagram illustrating an example system 900 for assisting or training operators to operate a machine in accordance with implementations described herein. In at least one example, the system 900 can include one or more machines 902 communicating over one or more networks 904 with one or more remote computing devices 906. The machine 902 may be the machine 100, for example. The one or more remote computing devices 906 may include tablet computing devices, desktop computing devices, laptop computing devices, mobile computing devices, cloud-based computing devices, server-based computing devices, or any other computing device capable of performing functionality described herein and communicating with the machine 902. The network(s) 904 may include a local area network (LAN), a wide area network (WAN), including but not limited to the Internet, or any combination thereof, and may include both wired and wireless communication technologies using any suitable protocols and communication techniques.

The system 900 can include one or more sensors 908, a display 910, one or more user interfaces 912, one or more controller 914, processor(s) 916, memory 918 communicatively coupled with the processor(s) 916, and one or more communication connections 920. In the illustrated example, the memory 918 of the machine 902 stores a signal module 922 and a graphical user interface (GUI) generation system 924. Although these systems are illustrated as, and will be described below as, separate components, functionality of the various systems may be attributed differently than discussed. Moreover, fewer or more systems and components may be utilized to perform the various functionalities described herein. Though depicted in FIG. 9 as residing in the memory 918 for illustrative purposes, it is contemplated that the signal module 922 and/or the GUI generation system 924 may additionally, or alternatively, be accessible to the machine 902 (e.g., stored on, or otherwise accessible by, memory remote from the machine 902).

The sensor(s) 908 can include any sensors described herein. For example, and without limitation, the sensor(s) 908 can include a rotational sensor, a position sensor, a track sensor, and/or other sensors. Without limitation, the sensor(s) 908 can be configured to generate data about aspects of the machine 902 and/or about an environment of the machine 902.

The user interface(s) 912 may be provided to an operator of the machine 902, e.g., to allow a user to interact with the machine 902. In some examples, the user interface(s) 912 are accessible by an operator of the machine 902 when the operator is in an operator cabin. The user interface(s) 912 can include display screens, touch screens, joysticks, steering wheels, switches, pedals, and/or any other mechanism or component with which the operator can interface.

The controller(s) 914 can include components that implement control signals. Without limitation, the controller(s) 914 may receive signals based on operator inputs received via the user interface(s) 912 and determine actions to implement those controls. The controller(s) 914 may include hydraulic controllers, actuator controllers, electronic controllers, or the like. In some instances, data from the user interface(s) 912 and/or the controller(s) 914 may be used to infer machine motion, as detailed further herein.

In at least one example, the signal module 922 can include functionality to generate one or more signals based on the sensor inputs. For example, the signal module 922 may include a vibration signal module configured to generate haptic signals. As another example, the signal module 922 may include an audible signal module configured to generate audible signals. In one example, the series of sounds (e.g., beeping, discord or disharmonious sound, etc.) may be produced by the audible signal module 108. In some embodiments, the audible signals may include a human voice (e.g., a simulated or a pre-recorded human voice) that may be produced by the signal module 922. In some embodiments, the audible signals may also mimic the sound emitted from any part of the machine 100 (e.g., grinding sound, over-stressed sound, the sound of the power source 124 such as an internal combustion engine). In some embodiments, the audible signals may include musical progressions or pre-recorded and/or synthesized sounds, that may be comfortable for the operator to hear and experience, while also being assisted, coached, and/or trained, to operate the machine 100 at the same time. A variety of such audible signals may be contemplated by someone of skill in the art, and the examples of audible signals discussed above and the nature of their production (e.g., their frequency) and their type need not be viewed as being limited or exhaustive. Similar discussions may be contemplated for the haptic signals, as well.

In some examples, the GUI generation system 924 can include functionality to generate one or more interactive interfaces, such as for presentation via the display 910. In some examples, the GUI generation system 924 may receive information from the signal module 922 to generate the GUIs. In some examples, the GUIs may illustrate the machine 902 and information about the state of the information. The state information may include a machine orientation vector. The GUIs may also present to an operator a confidence value associated with the state information. As discussed herein, state information determined using rotational data from the rotational sensor may be more accurate than state data determined using other techniques. This accuracy may be illustrated to an operator via a GUI.

The communication connection(s) 920 enable communication between the machine 902 and the remote computing device(s) 906 and/or other local or remote device(s). The remote computing device(s) 906 may include processor(s) 926, memory 928, and a GUI generation system 932. For instance, the communication connection(s) 920 can facilitate communication with the remote computing device(s) 906, such as via the network(s) 904. The communication connection(s) 920 can enable Wi-Fi-based communication such as via frequencies defined by the IEEE 802.11 standards, short range wireless frequencies such as BLUETOOTH®, other radio transmission, or any suitable wired or wireless communications protocol that enables the respective computing device to interface with the other computing device(s).

In some implementations, the machine 902 can send information, such as instructions to generate GUIs, sensor data, or the like to the remote computing device(s) 906, via the network(s) 904. The remote computing device(s) 906 can receive such information from the from the machine 902 via the communication connections 920, 940.

The remote computing device(s) 906 may also include communication connection(s) 940 that enable communication between the remote computing device(s) 906 and other local or remote device(s). For instance, the communication connection(s) 940 can facilitate communication with the machine 902 and/or other machines, such as via the network(s) 904. The communications connection(s) 940 can enable Wi-Fi-based communication such as via frequencies defined by the IEEE 802.11 standards, short range wireless frequencies such as BLUETOOTH®, other radio transmission, or any suitable wired or wireless communications protocol that enables the respective computing device to interface with the other computing device(s).

The processor(s) 916 of the machine 902 and the processor(s) 926 of the remote computing device(s) 906 can be any suitable processors capable of executing instructions to process data and perform operations as described herein. By way of example and not limitation, the processor(s) 916, 926 can comprise one or more Central Processing Units (CPUs), Graphics Processing Units (GPUs), or any other device or portion of a device that processes electronic data to transform that electronic data into other electronic data that can be stored in registers and/or memory. In some examples, integrated circuits (e.g., ASICs, etc.), gate arrays (e.g., FPGAs, etc.), and other hardware devices can also be considered processors in so far as they are configured to implement encoded instructions.

The memory 918 and the memory 928 are examples of non-transitory computer-readable media. The memory 918, 928 can store an operating system and one or more software applications, instructions, programs, and/or data to implement the methods described herein and the functions attributed to the various systems. In various implementations, the memory can be implemented using any suitable memory technology, such as static random-access memory (SRAM), synchronous dynamic RAM (SDRAM), nonvolatile/Flash-type memory, or any other type of memory capable of storing information. The architectures, systems, and individual elements described herein can include many other logical, programmatic, and physical components, of which those shown in the accompanying figures are merely examples that are related to the discussion herein.

Although various systems and components are illustrated as being discrete systems, the illustrations are examples only, and more or fewer discrete systems may perform the various functions described herein. Moreover, functionality ascribed to the machine 902 may be performed at the remote computing device(s) 906 and/or functionality ascribed to the remote computing device(s) 906 may be performed at the machine 902.

Figure 10:
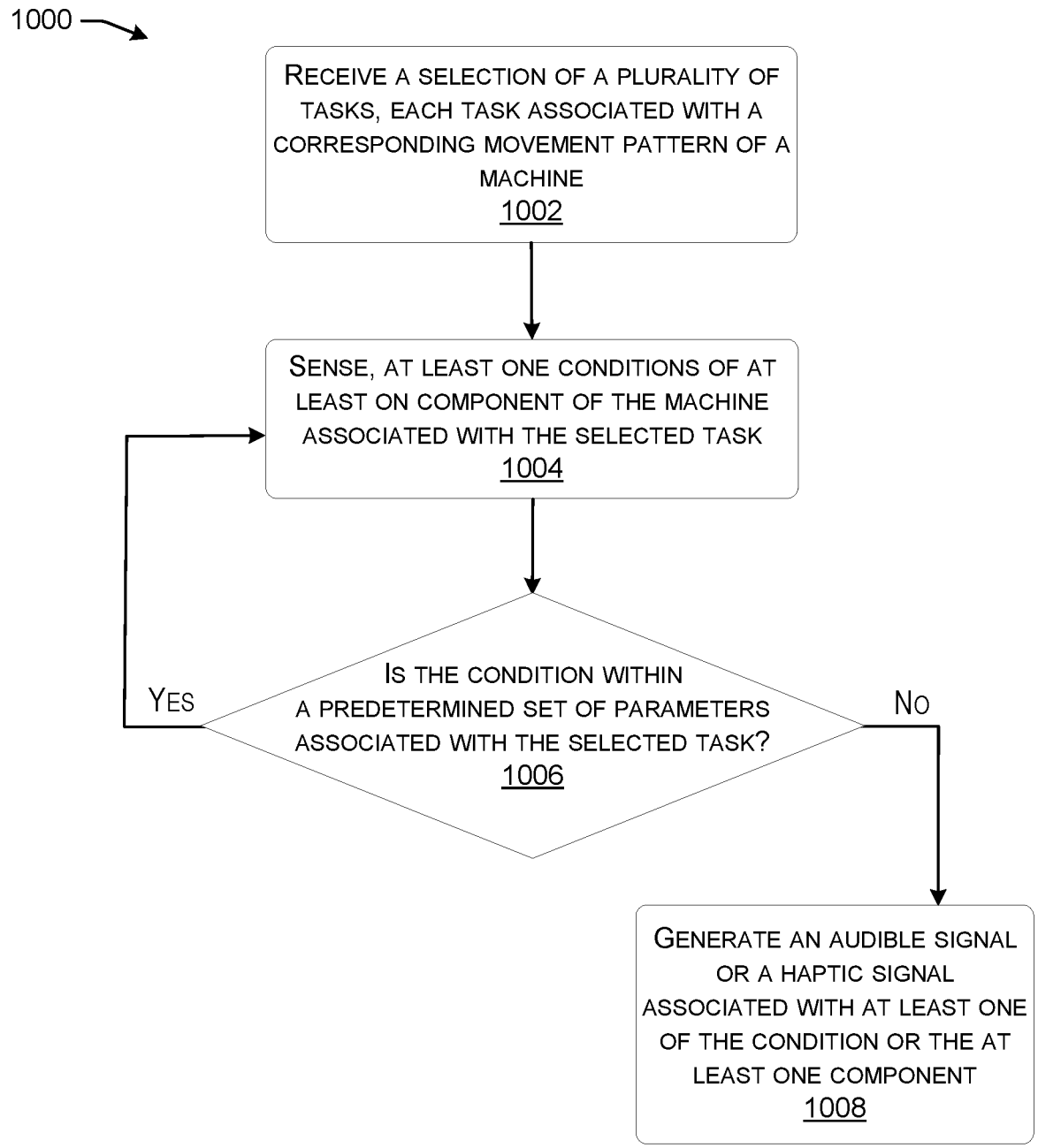
FIG. 10 is a flowchart illustrating a method for assisting or training an operator to operate the machine, in accordance with an aspect of the present disclosure.

Referring to FIG. 10, an exemplary method for assisting or training an operator to operate the machine 100 is discussed. The method for assisting or training may be carried out as an on-the-job exercise (either onsite or remotely) or as an exercise in the simulation exercise environment 800, as discussed above. The method is described by way of a flowchart 1000 and is discussed in conjunction with the FIGS. 1-9. The method starts at operation 1002.

At operation 1002, a controller (e.g., the controller 102) may receive a selection of a task of a plurality of tasks, each task associated with a corresponding movement pattern of a machine (e.g., the machine 100). The selection of the task may be provided by an operator (e.g., a novice operator) via one or more of the interfaces and/or devices (e.g., the input device 164). Examples of the plurality of tasks may include, but are not limited to, a task associated with lifting an implement (e.g., the implement 148), a task associated with moving the machine from a first location to a second location (e.g., backing up the machine 100 from a material bank to the second location), a task associated with moving the machine from the second location to a third location (e.g., moving the machine 100 from the second location to a dumpsite), a task associated with applying a brake under propulsion, a task associated with steering the machine 100 with the implement high in the air, etc.

At operation 1004, a sensor unit (e.g., the sensor unit 104), may sense at least one condition of at least one component of the machine associated with the selected task. In some examples, the sensor unit may sense one or more conditions associated with the implement of the machine. For example, the condition may include a position of the implement relative to a surface on which the machine travels. As another example, the condition may include a load of the implement. In some examples, the sensor unit may sense one or more conditions associated with a wheel (e.g., the forward wheel 136, the rearward wheel 140) of the machine. For example, the sensor unit may sense a movement of the wheel of the machine. As another example, the sensor unit may sense a lateral acceleration of the machine. As another example, the sensor unit may sense a steering angle of the wheel.

At operation 1004, the controller may determine whether the condition is within a predetermined set of parameters associated with the selected task.

In one example, the selected task may include a task associated with lifting the implement, and the sensor unit may sense an initial position of the implement relative to the surface on which the machine travels. The predetermined set of parameters includes an ideal initial position of the implement and an allowable deviation in the position of the implement from the ideal initial position of the implement. The controller of the machine may determine whether the initial position of the implement is within the allowable deviation.

In another example, the selected task may include a task associated with moving from a first location to a second location (e.g., backing up the machine from a material bank to the second location), and the sensor unit may sense a movement of the wheel of the machine. The predetermined set of parameters includes a first location and a second location. The controller of the machine may determine a relative location of the machine based on the movement and determine whether the machine is moving from the first location to the second location within a predetermined time. In some examples, moving from the first location to the second location includes moving the machine in one of a forward direction or a reverse direction.

In another example, the selected task may include a task associated with moving the machine from the second location to a third location (e.g., moving the machine from the second location to a dumpsite), and the sensor unit may sense a movement of the wheel of the machine. The predetermined set of parameters includes a predetermined distance and an allowable deviation in distance from the predetermined distance. The controller of the machine may determine a relative location of the machine based on the movement and determine whether the machine travels the predetermined distance within the allowable deviation.

In another example, the selected task may include a task associated with applying a brake (e.g., the brake 126) under propulsion, and the sensor unit 104 may sense a movement of a wheel (e.g., the forward wheel 136, the rearward wheel 140) of the machine 100 and a braking amount applied to the brake of the machine 100. The predetermined set of parameters includes a predetermined maximum braking amount with respect to an engine throttle amount of the machine 100. The controller 102 of the machine 100 may determine a braking amount of the machine 100 based on the movement and determine whether the braking amount of the machine 100 is above the maximum braking amount.

In another example, the selected task may include a task associated with steering the machine 100 with the implement high in the air, and the sensor unit may sense a lateral acceleration of the machine, a movement of the wheel of the machine, a steering angle of the wheel, a position of the implement, and a load on the implement. The predetermined set of parameters includes a predetermined lateral acceleration determined based on a speed of the machine, a turning radius of the machine, a position of the implement, and a load on the implement. The controller of the machine may determine whether the sensed lateral acceleration is below the predetermined lateral acceleration.

If the condition is within a predetermined set of parameters associated with the selected task ("Yes" at operation 1006), operation 1004 is executed. If the condition is not within a predetermined set of parameters associated with the selected task ("No" at operation 1006), operation 1008 is executed.

At operation 1008, the controller may generate an audible signal associated with at least one of the condition or the at least one component. In some examples, the audible signal may include a series of sounds (e.g., beeping, discord or disharmonious sound, etc.). In some examples, the audible signals may include a human voice (e.g., a simulated or a pre-recorded human voice). In some examples, the audible signals may also mimic the sound emitted from any part of the machine (e.g., grinding sound, over-stressed sound, the sound of a power source of the machine, such as an internal combustion engine). In some examples, the audible signals may include musical progressions or pre-recorded and/or synthesized sounds, that may be comfortable for the operator to hear and experience, while also being assisted, coached, and/or trained, to operate the machine at the same time.

INDUSTRIAL APPLICABILITY

The audible or haptic signals provided at one or more instances during the movement of the machine allows a novice operator to analyze and execute one or more operational sequences in real time, in concordance with a manner in which an experienced operator may execute the operational sequences. This is because the signals may indicate where an operational behavior or operational pattern needs a change and/or where an operational stage of the machine has been achieved according to a manner in which an experienced operator may execute the operational sequences. For example, a system may assist an operator in operating a machine by providing audible or haptic signals. A controller of the system may receive a selection of a task of a plurality of tasks, each task associated with a corresponding movement pattern of the machine. A sensor unit of the system may sense at least one condition of at least one component of the machine associated with the selected task. The controller of the system may determine whether the condition is within a predetermined set of parameters associated with the selected task. In response to determining that the condition is not within the predetermined set of parameters, the controller of the system may further generate an audible or a haptic signal associated with at least one of the condition or the at least one component. Further, the assistance or training imparted to a novice operator in such a manner is neither labor intensive nor cumbersome to learn. This is because there is no or negligible need for an experienced operator or teacher to supervise the novice operator's operations and provide a human intensive step-by-step guidance.

In case the techniques described herein are applied for training a novice operator, a need to review the novice operator's operational pattern and provide feedback at a later time may also not be needed. The manner of training (or assistance) as disclosed and iterated in the present application is intuitive and aids in speeding up the overall training process and makes the training experience more practical, beneficial, and teachable, to novice operators. The immediacy of the feedback also increases the training's effectiveness compared to the conventional slower, after-shift reporting methods. For example, the severity of the audible or haptic signal may increase as the condition increasingly deviates from the predetermined set of parameters. As another example, the severity of the audible or haptic signal may decrease as the condition increasingly approaches the predetermined set of parameters. Further, such a training or coaching method is also less cognitively intrusive than methods that rely on providing visual signals to an operator, in turn clogging his/her field of view. Therefore, the disclosed systems and methods for training (or assisting) an operator to operate the machine also clears and/or negates altogether, the visual clutter an operator may face during machine operations, in turn increasing operator comfort and enhancing operational productivity. Additionally, the techniques described herein may also be applied to assist experienced operators and may prevent experienced operators from deviating from an optimal operating pattern, during operations. These techniques are also directly applicable to providing coaching or training in remote operator station or simulation environments where the operator is not sitting in the machine during the operations.

It will be apparent to those skilled in the art that various modifications and variations can be made to the method and/or system of the present disclosure without departing from the scope of the disclosure. Other embodiments will be apparent to those skilled in the art from consideration of the specification and practice of the method and/or system disclosed herein. It is intended that the specification and examples be considered as exemplary only, with a true scope of the disclosure being indicated by the following claims and their equivalent.

What is claimed is:

1. A method for assisting an operator in operating a machine, the method comprising:
   receiving, by a controller, a selection of a task of a plurality of tasks, each task associated with a corresponding movement pattern of the machine;
   sensing, by a sensor unit, at least one condition of at least one component of the machine associated with the selected task, wherein sensing the at least one condition includes sensing a movement of a wheel of the machine;
   determining, by the controller, whether the condition is within a predetermined set of parameters associated with the selected task, the predetermined set of parameters including a predetermined maximum breaking amount with respect to an engine throttle amount of the machine, and wherein determining whether the condition is within the predetermined set of parameters includes:
      determining a braking amount of the machine based on the movement, and
      determining whether the braking amount is above the predetermined maximum braking amount; and
   in response to determining that the condition is not within the predetermined set of parameters:
      generating, by the controller, an audible or a haptic signal associated with at least one of the condition or the at least one component, and
      causing, by the controller, a feedback component of the machine to provide audible or haptic feedback based on the signal.

2. The method of claim 1, wherein generating the audible or the haptic signal includes:
   increasing severity of the audible or the haptic signal as the condition increasingly deviates from the predetermined set of parameters, or
   decreasing the severity of the audible or the haptic signal as the condition increasingly approaches the predetermined set of parameters.

3. The method of claim 1, wherein:
   the at least one component is an implement attached to the machine,
   sensing the at least one condition of the at least one component includes:
   sensing an initial position of the implement relative to a surface on which the machine travels,
   the predetermined set of parameters includes an ideal initial position of the implement and an allowable deviation in position of the implement from the ideal initial position of the implement, and
   determining, by the controller, whether the condition is within the predetermined set of parameters associated with the selected task includes:
      determining whether the initial position of the implement is within the allowable deviation.

4. The method of claim 1, wherein:
   the predetermined set of parameters includes a first location and a second location, and
   determining, by the controller, whether the condition is within the predetermined set of parameters associated with the selected task includes:
      determining a relative location of the machine based on the movement, and determining whether the machine is moving from the first location to the second location within a predetermined time.

5. The method of claim 4, wherein moving from the first location to the second location includes moving the machine in one of a forward direction or a reverse direction.

6. The method of claim 1, wherein:
the predetermined set of parameters includes a predetermined distance and an allowable deviation in distance from the predetermined distance, and
determining, by the controller, whether the condition is within the predetermined set of parameters associated with the selected task includes:
determining a relative location of the machine based on the movement, and
determining whether the machine travels the predetermined distance within the allowable deviation.

7. The method of claim 1, wherein:
the at least one component is an implement attached to the machine,
sensing the at least one condition of the at least one component includes:
sensing a lateral acceleration of the machine,
sensing a steering angle of the wheel,
sensing a position of the implement, and
sensing a load on the implement,
the predetermined set of parameters includes a predetermined lateral acceleration based on a speed of the machine, a turning radius of the machine, a position of the implement, and a load on the implement, and
determining, by the controller, whether the condition is within the predetermined set of parameters associated with the selected task includes:
determining whether the lateral acceleration sensed is below the predetermined lateral acceleration.

8. A system comprising:
one or more processors;
a machine; and
one or more computer-readable storage media storing instructions that, when executed by the one or more processors, cause the system to perform operations comprising:
receiving, by a controller, a selection of a task of a plurality of tasks, each task associated with a corresponding movement pattern of the machine;
sensing, by a sensor unit, at least one condition of at least one component of the machine associated with the selected task, wherein sensing the at least one condition includes sensing a movement of a wheel of the machine;
determining, by the controller, whether the condition is within a predetermined set of parameters associated with the selected task, the predetermined set of parameters including a predetermined maximum braking amount with respect to an engine throttle amount of the machine, and wherein determining whether the condition is within the predetermined set of parameters includes:
determining a braking amount of the machine based on the movement, and
determining whether the braking amount is above the predetermined maximum braking amount; and
in response to determining that the condition is not within the predetermined set of parameters:
generating, by the controller, an audible or a haptic signal associated with at least one of the condition or the at least one component, and
causing, by the controller, a feedback component of the machine to provide audible or haptic feedback based on the signal.

9. The system of claim 8, wherein:
the at least one component is an implement attached to the machine,
the predetermined set of parameters includes an ideal initial position of the implement and an allowable deviation in position of the implement from the ideal initial position of the implement, the operations further comprising:
sensing an initial position of the implement relative to a surface on which the machine travels; and
determining whether the initial position of the implement is within the allowable deviation.

10. The system of claim 8, wherein
the predetermined set of parameters includes a first location and a second location, the operations further comprising:
determining a relative location of the machine based on the movement; and
determining whether the machine is moving from the first location to the second location within a predetermined time.

11. The system of claim 8, wherein
the predetermined set of parameters includes a predetermined distance and an allowable deviation in distance from the predetermined distance, the operations further comprising:
determining a relative location of the machine based on the movement; and
determining whether the machine travels the predetermined distance within the allowable deviation.

12. The system of claim 8, wherein
the at least one component is an implement attached to the machine,
the predetermined set of parameters includes a predetermined lateral acceleration based on a speed of the machine, a turning radius of the machine, a position of the implement, and a load on the implement, the operations further comprising:
sensing a lateral acceleration of the machine;
sensing a steering angle of the wheel;
sensing a position of the implement;
sensing a load on the implement; and
determining whether the lateral acceleration sensed is below the predetermined lateral acceleration.

13. One or more non-transitory computer-readable media storing instructions which, when executed by one or more processors, perform operations comprising:
receiving, by a controller, a selection of a task of a plurality of tasks, each task associated with a corresponding movement pattern of a machine;
sensing, by a sensor unit, at least one condition of at least one component of the machine associated with the selected task, wherein sensing the at least one condition includes sensing a movement of a wheel of the machine;
determining, by the controller, whether the condition is within a predetermined set of parameters associated with the selected task, the predetermined set of parameters including a predetermined maximum braking amount of the machine, and wherein determining whether the condition is within the predetermined set of parameters includes:
determining a braking amount of the machine based on the movement, and determining whether the braking amount is above the predetermined maximum braking amount; and in response to determining that the condition is not within the predetermined set of parameters:
- generating, by the controller, an audible or a haptic signal associated with at least one of the condition or the at least one component, and
- causing, by the controller, a feedback component of the machine to provide audible or haptic feedback based on the signal.

14. The one or more non-transitory computer-readable media of claim 13,
the at least one component is an implement attached to the machine,
the predetermined set of parameters includes an ideal initial position of the implement and an allowable deviation in position of the implement from the ideal initial position of the implement, the operations further comprising:
- sensing an initial position of the implement relative to a surface on which the machine travels; and
- determining whether the initial position of the implement is within the allowable deviation.

15. The one or more non-transitory computer-readable media of claim 13, wherein
the predetermined set of parameters includes a first location and a second location, the operations further comprising:
- determining a relative location of the machine based on the movement; and
- determining whether the machine is moving from the first location to the second location within a predetermined time.

16. The one or more non-transitory computer-readable media of claim 13, wherein
the predetermined set of parameters includes a predetermined distance and an allowable deviation in distance from the predetermined distance, the operations further comprising:
- determining a relative location of the machine based on the movement; and
- determining whether the machine travels the predetermined distance within the allowable deviation.

17. The one or more non-transitory computer-readable media of claim 13, wherein
the at least one component is an implement attached to the machine,
the predetermined set of parameters includes a predetermined lateral acceleration based on a speed of the machine, a turning radius of the machine, a position of the implement, and a load on the implement, the operations further comprising:
- sensing a lateral acceleration of the machine;
- sensing a steering angle of the wheel;
- sensing a position of the implement;
- sensing a load on the implement; and
- determining whether the lateral acceleration sensed is below the predetermined lateral acceleration.

* * * * *